(12) United States Patent
Lukacs (10) Patent No.: US 7,606,571 B2
(45) Date of Patent: Oct. 20, 2009

(54) WIRELESS INTELLIGENT NETWORK (WIN) SUPPORT FOR CENTRALIZED SERVICE CONTROL IN AN IP MULTIMEDIA SUBSYSTEM (IMS) NETWORK

(76) Inventor: Donald Lukacs, 56 Washington St., Apartment B, Red Bank, NJ (US) 07701

( * ) Notice: Subject to any disclaimer, the term of this patent is extended or adjusted under 35 U.S.C. 154(b) by 94 days.

(21) Appl. No.: 11/717,342

(22) Filed: Mar. 13, 2007

(65) Prior Publication Data

US 2007/0213037 A1    Sep. 13, 2007

Related U.S. Application Data

(60) Provisional application No. 60/781,785, filed on Mar. 13, 2006.

(51) Int. Cl.
*H04W 40/00* (2006.01)
(52) U.S. Cl. .................... 455/445; 455/414.1; 455/428; 455/560; 370/338; 379/207.02
(58) Field of Classification Search ............. 455/422.1, 455/428, 416–417, 414.1–414.2, 445–446, 455/461, 466, 560; 370/259–261, 264, 267, 370/401, 404, 386, 351–352, 338; 379/93.21, 379/93.23, 114.29, 121.01, 219, 221.08, 379/221.09, 207.01, 207.02
See application file for complete search history.

(56) References Cited

U.S. PATENT DOCUMENTS

| 6,718,178 | B1 * | 4/2004 | Sladek et al. ............. 455/414.1 |
| 7,142,857 | B1 * | 11/2006 | Calabrese et al. ........... 455/436 |
| 7,245,908 | B1 | 7/2007 | Weaver et al. |
| 2005/0096032 | A1 * | 5/2005 | Benco et al. .............. 455/422.1 |
| 2006/0126814 | A1 | 6/2006 | Weidmark et al. |
| 2007/0123238 | A1 * | 5/2007 | Jagadeesan et al. ......... 455/415 |
| 2007/0223668 | A1 | 9/2007 | Blumenfeld et al. |
| 2008/0310397 | A1 * | 12/2008 | Hu et al. ..................... 370/352 |

OTHER PUBLICATIONS

Copy of International Search Report, dated Jul. 7, 2008 (4 pages).

* cited by examiner

*Primary Examiner*—Kamran Afshar
(74) *Attorney, Agent, or Firm*—Fitch, Even, Tabin & Flannery (57) ABSTRACT

Feature control signaling can be transported from a handset to a network-based service platform when the handset is active on an existing call, using three-way calling and Intelligent Network (IN) capabilities to pass feature control information from the user device to a network-based service platform. Although Wireless Intelligent Network (WIN) standards do not support mid-call triggers, handset emulation of three-way-calling (3WC) behavior allows a handset to send a digit string (representing a particular feature-related event) to a network-based service platform (in the context of a pseudo-3WC). Mid-call communications can be accomplished in this manner, allowing a network-based service platform to interpret and take action based on the received digit string, prior to releasing the additional call leg associated with the pseudo-3WC attempt. WIN mechanisms can also be used to send feature control signals from a network-based service platform to a handset. These mechanisms can be used to promote consistent service offerings for users who are served by networks that are comprised of different technologies. These mechanisms can also be used to help operators transition their networks to support emerging network technologies.

35 Claims, 6 Drawing Sheets

WIRELESS INTELLIGENT NETWORK (WIN) SUPPORT FOR CENTRALIZED SERVICE CONTROL IN AN IP MULTIMEDIA SUBSYSTEM (IMS) NETWORK

CROSS-REFERENCE TO RELATED APPLICATIONS

This application claims the benefit of U.S. Provisional Patent Application No. 60/781,785, filed Mar. 13, 2006, which is hereby incorporated herein by reference in its entirety.

FIELD OF THE INVENTION

The present invention relates generally to the field of telecommunications networks and the provisioning and implementation of services in such networks. More particularly, the invention relates to wireless telecommunications networks and IP Multimedia Subsystems (IMS) networks, and the use of Wireless Intelligent Network (WIN) functionality to support an IMS-based centralized service execution model.

BACKGROUND OF THE INVENTION

Wireless standards (Third Generation Partnership Program [3GPP] and 3GPP2 Voice Call Continuity [VCC]) are exploring mechanisms to allow VCC users to move between Circuit-Switched (CS) access (via cellular systems) and other wireless access (e.g., WiFi/Wireless LAN access into an IMS infrastructure).

It is important that the corresponding "domain transfer" mechanism, applied when an existing call is in progress in one domain, should allow the transfer of the existing bearer path to the alternate domain. The domain transfer mechanism should also support the transfer of a signaling path in the new domain. In addition, the user should ideally experience seamless mobility during and after the domain transfer.

Figure 1:
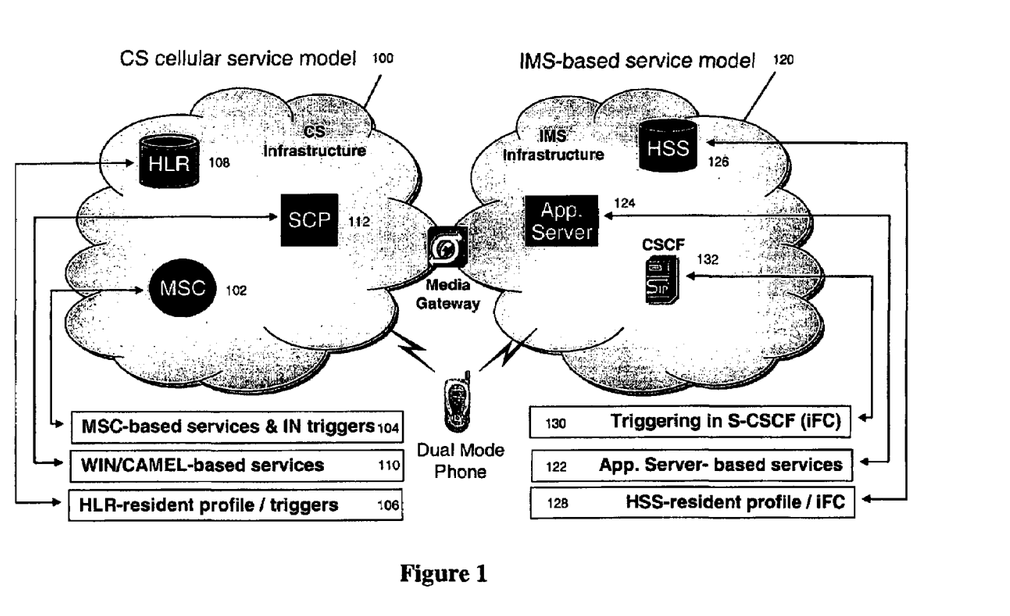
FIG. 1 shows the architecture of the CS cellular and IMS service execution models.

To address service mobility, the industry has pursued two basic approaches—a distributed service execution model and an (IMS-based) centralized service execution model. FIG. 1 depicts the basic architecture of these two service models.

In the CS cellular model 100, voice services are typically offered via the Mobile Switching Center (MSC) 102. Such features can be MSC-based features 104, whereby the service logic resides in the MSC, and the MSC retrieves user profile information 106 from the Home Location Register (HLR) 108 to determine whether a selected feature is subscribed for and is active for a particular user. Alternatively, Intelligent Network (IN) based services 110 can be invoked, using triggers that are armed in the MSC—this mechanism causes the MSC to request instructions from a Service Control Point (SCP) 112, which executes IN service logic 110 that defines the particular service behavior.

In the IMS model 120, similar functionality is provided via a different mechanism. With IMS, the service logic 122 resides in an Application Server 124. The Home Subscriber Server (HSS) 126 stores user-related profile information 128, including initial Filter Criteria (iFC) that are used to trigger special service processing. This iFC mechanism is used to arm triggers 130 at a (Serving) Call Session Control Function (CSCF) 132. When a particular iFC condition is satisfied, the CSCF will communicate with a corresponding Application Server (as designated by the iFC), which will invoke the desired service behavior.

In general, the distributed service execution model attempts to offer services via the network where the user is currently attached. Thus, the user might access MSC-based or IN-based services when accessing the CS domain—but might access IMS-based services when accessing the IMS domain.

In contrast, the (IMS-based) centralized service execution model attempts to offer IMS-based services to the user, independent of the network where the user is currently attached (i.e., even when the user is accessing the CS domain). This model promotes consistent execution of IMS-based services, independent of the user's current access. This model makes more limited use of the CS service infrastructure (as required to enable IMS service execution).

The centralized service execution model offers a number of advantages over the distributed service execution model. For example, it provides a mechanism to allow the user's features to operate consistently, independent of the user's current access. The centralized service execution model also allows the user's features to be created in a common (IMS-based) manner—thereby avoiding the need to create and deploy multiple versions of the same services (for cellular and IMS domains). The model focuses the feature-interaction problem on a single (IMS) domain, eliminating the need to address interactions between services that might otherwise execute in different domains (e.g., as MSC-based features, IN-based features, or IMS-based features). The centralized service execution model is more forward-looking, consistent with the intended direction of some operators who desire to move toward an IMS-based network infrastructure. The model provides a framework for addressing some difficulties that might otherwise persist with the distributed service execution model. For example, if a user invokes an MSC-based multi-leg call feature, and then moves to the IMS domain, it may be difficult to transfer the current CS connection and call-state information to the IMS domain.

Figure 2:
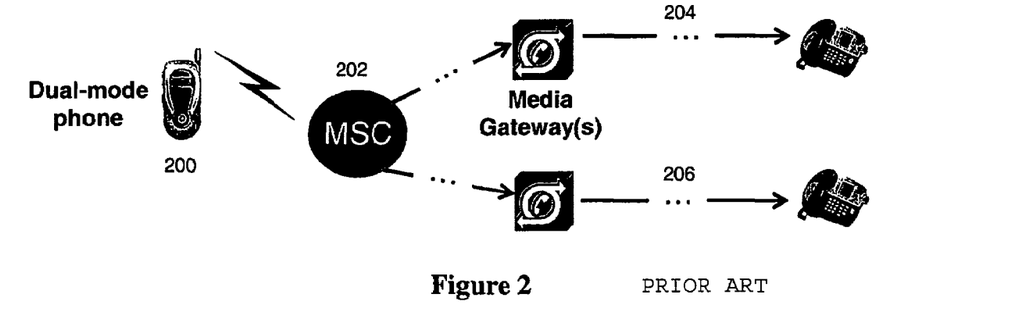
FIG. 2 shows multi-leg treatment of a session within a distributed service execution model.

This problem is illustrated in FIG. 2. In FIG. 2, if a user handset 200 invokes an MSC-based multi-leg call feature 202, and subsequently wishes to transfer that connection and call-state information to the IMS domain, this might require the multiple bearer connections to be correlated and established in the IMS domain, in order to re-construct the current call state in the IMS domain. This can require complex processing—and would be further complicated if one of the existing CS call legs 204,206 happened to be on hold at the time of the domain transfer.

With the centralized service execution model, the MSC 300 would instead maintain a single bearer channel to the IMS domain (e.g., relying on a Media Resource Function (MRF) 302 within the IMS domain to provide any bridging/media-manipulation functionality). This is illustrated in FIG. 3.

Figure 3:
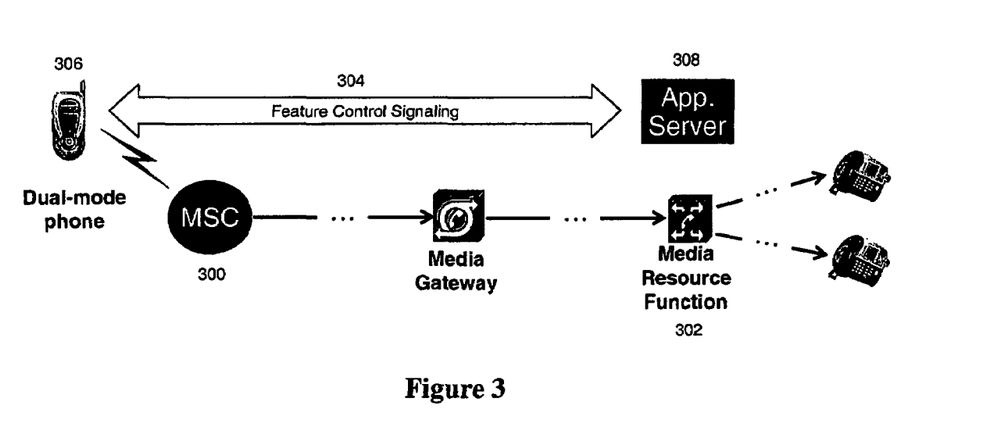
FIG. 3 shows multi-leg treatment of a session within a centralized service execution model.

FIG. 3 illustrates the need for a mechanism to exchange feature control 304 signaling between the user device 306 and an IMS-based Application Server 308. This mechanism should support bi-directional operation and should be enabled during an active CS call, allowing the network to send notifications to the user (e.g., notification of incoming call, as used in conjunction with call waiting) and allowing the user to send feature control information to the Application Server (e.g., "hold", "join", "request for pre-paid balance", etc.)

Whereas existing mechanisms support the ability to exchange feature control messages when the user is served by the IMS domain (i.e., based on use of the Session Initiation Protocol (SIP)), there is a need for a mechanism that can be used to support such feature control signaling when the user is served by the CS domain as illustrated in FIG. 3.

For GSM networks, the use of Unstructured Supplementary Services Data (USSD) capability has been defined for this purpose—allowing a GSM handset to communicate with a network-based service platform. It is noted that this solution is not yet fully defined. Message formats for service requests need to be identified. Some options include the use of SIP templates or feature codes.

For CDMA network deployments, no USSD-like mechanism is currently available. However, the industry is currently exploring at least two options for this: (i) support for simultaneous packet and circuit service—where the packet capability might be used to enable communications between the user device and a network-based service platform during an active CS call; and, (ii) support for a modified Short Message Service (SMS) capability—allowing the user device to signal via the CS access network, which would then relay such messaging to a network-based service platform.

Currently, the USSD solution is only defined for GSM networks. Thus, there remains a need for a solution specifically targeted at CDMA networks, where USSD is not available. Other potential solutions for CDMA networks would require network modifications—making them more costly and potentially delaying the deployment of this capability.

BRIEF SUMMARY OF THE INVENTION

The invention enables feature control signaling between the user handset and a network-based service platform (when the user handset is served by CS access) based on the use of Wireless Intelligent Network (WIN) technology.

In the present invention, WIN mechanisms are used to support the exchange of feature control signals between a handset and a network-based service platform. As used herein, the term "network-based service platform" refers to a network component (which can be composed of a single element or a distributed group of elements) that supports the execution of service logic that is used to offer communications services. The network-based service platform is capable of executing service logic that spans across multiple technology domains, including the ability to communicate via intelligent network (IN) technology. Examples of such a network-based service platform include, but are not limited to, a network component (which can comprise a single element or a distributed group of elements) that supports any of the following: the combined functionality of a Wireless Intelligent Network (WIN) Service Control Point (SCP) and an IMS Application Server (AS); the combined functionality of a Customized Application Mobile Enhanced Logic (CAMEL) Service Control Function (SCF) and an IMS AS; the combined functionality of an Advanced Intelligent Network (AIN) Service Control Point (SCP) and an IMS AS; and the combined functionality of a Core INAP Service Control Function (SCF) and an IMS AS.

The proposed solution can be broken down into two separable mechanisms. The first mechanism addresses how to allow the user handset to send feature control information to a network-based service platform (e.g., "hold", "join", etc.). The present invention makes use of an appropriate originating WIN trigger (e.g., All_Calls) that is armed at the visited MSC when the user handset registers with that MSC. Although WIN standards do not support mid-call triggers, handset emulation of three-way-calling (3WC) behavior allows a digit string (generated by the handset in the context of a pseudo-3WC) to be sent to a network-based service platform. Mid-call communications can be accomplished in this manner, allowing the network-based service platform to interpret and take action based on the received digit string, prior to releasing the additional call leg associated with the pseudo-3WC attempt.

The second mechanism addresses how to allow the network to send notifications to the user handset (e.g., notification of an incoming call, as used in conjunction with call waiting).

Figure 4:
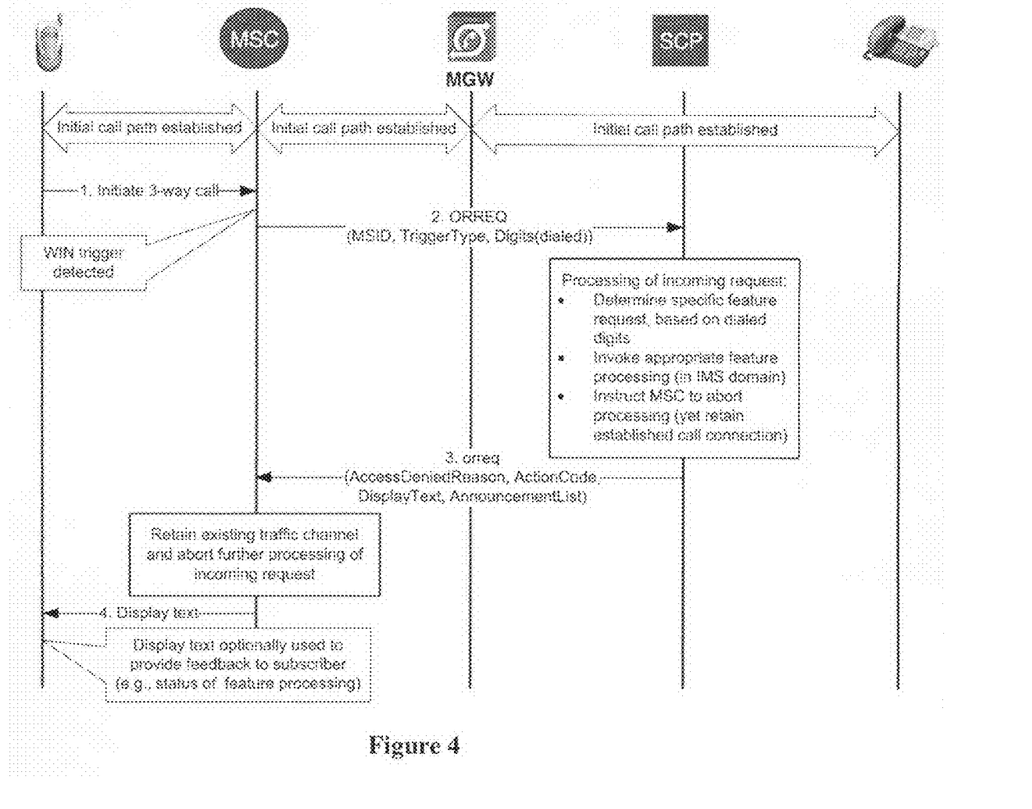
FIG. 4 shows the mechanism to support feature control signaling from a user to a network-based service platform (with feedback in the reverse direction).
Figure 5:
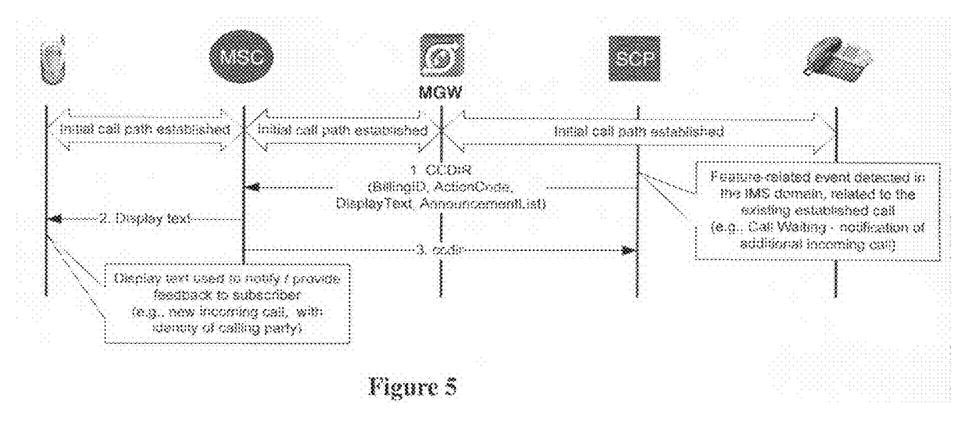
FIG. 5 shows the mechanism for using standard WIN Call Control Directive (CCDIR) messages to request the MSC to take particular feature-related actions during an existing call.

By combining the two mechanisms that are illustrated in FIGS. 4 and 5, standard WIN-based capabilities can be applied to enable feature control signaling between the user handset and a network-based service platform (when the user is served via CS access).

The result of combining the mechanisms is a system that does not require any new capabilities in existing cellular Radio Access Networks or in existing MSCs (or in existing HLRs, as with the USSD approach). It relies solely on existing (i.e., already standardized) WIN capabilities from the current cellular networks, thereby avoiding the need for additional network enhancements.

The following detailed description focuses on the use of WIN to support the desired capabilities. CDMA networks are viewed as a principal application for this capability. However, it is noted that analogous solutions are possible for other IN-based network technologies, other than WIN (e.g., corresponding Customized Application Mobile Enhanced Logic (CAMEL)-based procedures might be pursued if USSD capabilities are not available, or if a more common approach is desired across GSM and CDMA solutions). A similar approach might also be pursued for wireline networks, potentially helping to facilitate the migration path for existing wireline network operators as they evolve their networks towards an IMS-based approach.

The present invention will be more clearly understood when the following detailed description is read in conjunction with the accompanying drawings.

DETAILED DESCRIPTION

The proposed approach to enable feature control signaling between a user handset and a network-based service platform (when the user handset is served by CS access) is based on the use of Wireless Intelligent Network (WIN) technology. Current WIN standards do not include support for any mid-call triggers. Thus, a 'conventional' IN approach for supporting the delivery of mid-call feature-related signaling from the handset to a network-based service platform is not available. Also, the continued expansion of WIN capabilities on existing MSCs is not generally favored, given the current emphasis on more forward-looking IMS technologies for deployment of advanced services, so the addition of mid-call triggers in future WIN standards is unlikely to be pursued.

The present invention provides a mechanism for supporting such mid-call feature-related signaling.

The solution is broken down into two separable mechanisms. The first mechanism addresses how to allow the user to send feature control information to a network-based service platform (e.g., "hold", "join", etc.). This proposed mechanism is illustrated in FIG. 4. The proposed approach makes use of existing WIN call origination triggers. Any one from a number of existing originating WIN triggers can be used, such as the All_Calls, Double_Introducing_Star, Single_Introducing_Star, Double_Introducing_Pound, Single_Introducing_Pound, K_Digit, or Origination_Attempt_Authorized triggers. The specific trigger type to be chosen may depend on the specific format of the feature code digits to be delivered, as well as whether particular triggers are to be applied by the network operator for other purposes—yet this decision does not impact the general mechanism proposed here. The present invention uses an appropriate originating WIN trigger (e.g., All_Calls) that is armed at the visited MSC (using standard cellular procedures, when the user handset registers with that MSC). In addition, the present invention requires that (the CallingFeaturesIndicator item within) the user profile (normally obtained from the HLR during registration) should indicate that the user is subscribed to the three-way calling (3WC) feature. This differs from the normal rule for the IMS centralized service execution model, which would suggest that MSC-based features should be disabled, in favor of execution of corresponding IMS-based services.

By arming the above WIN trigger and enabling the MSC-based 3WC feature, it is noted that virtually all originating call requests (excluding emergency calls, but including requests to establish an additional call leg for a three-way call) will result in the corresponding WIN trigger condition being satisfied at the MSC. Thus, whenever the handset is active on a CS call and subsequently initiates an additional call (as in step 1 of FIG. 4), the MSC will send a WIN OriginationRequest (ORREQ) message that is directed to a network-based service platform (i.e., SCP, as specified for the corresponding trigger). The ORREQ message (step 2) will include the digits that were received from the user handset, along with other information such as the Mobile Station Identifier (MSID) and the specific type of trigger that was detected. At this point, the SCP will interpret the digits received in the ORREQ message to determine the intended service request and (behaving as an Application Server in the IMS domain) will invoke the necessary processing for the desired service. The SCP then responds back to the MSC (step 3) to instruct the MSC to abort further processing associated with this "3WC" (feature) request—and may also optionally request that an indication be provided to the user (e.g., via the inclusion of the DisplayText and/or AnnouncementList parameters). To instruct the MSC to drop this new call leg (associated with the 3WC attempt) and still retain the existing call, the SCP can populate the appropriate AccessDeniedReason parameter (e.g., with a value of "Service denied") or ActionCode parameter (e.g., with a value of "Disconnect Call Leg"). Depending upon MSC support for such treatment, the SCP can alternately return a special Digits (dialed) or TerminationList value, to cause the MSC to route the additional call leg into the IMS network (from where appropriate IMS feature/leg-release processing could be provided).

The second mechanism addresses how to allow the network to send notifications to the user (e.g., notification of incoming call, as used in conjunction with call waiting). This mechanism is illustrated in FIG. 5. FIG. 5 illustrates how the standard WIN Call Control Directive (CCDIR) message can be used to request the MSC to take particular feature-related actions during an existing call. Note that this mid-call mechanism already exists in the WIN standards (e.g., used to support Pre-Paid Charging)—yet is not considered a mid-call trigger, since trigger conditions are detected and acted upon by the MSC, whereas this message originates from the SCP.

To support the delivery of feature-related information from the network to the handset, the SCP will send a WIN CCDIR message (step 1) that is directed to the MSC. The DisplayText parameter enables the delivery of a textual message to the user (e.g., a notification of an additional incoming call, to allow the user to invoke call waiting—via the mechanism outlined previously in FIG. 4). The BillingID parameter identifies the specific existing call (to which this message is associated), and the ActionCode and/or AnnouncementList parameters are used to designate any desired feature-related actions (e.g., call tear-down, or playing of an announcement/tone). The MSC performs the requested actions (e.g., delivering text to be displayed via the handset, as depicted in step 2) and responds back to the SCP (as illustrated in step 3).

By combining the mechanisms that are illustrated in FIGS. 4 and 5, the result is a novel approach for how standard WIN-based capabilities can be applied to enable feature control signaling between the user handset and a network-based service platform (when the user handset is served via CS access). The present invention has the following properties. First, the invention requires new logic that must be incorporated into the applicable dual-mode handsets. Such handsets must be able to interpret user inputs (via appropriate function keys or other handset-specific user interface technologies) in order to determine associated digit strings for each feature control event. These digit strings may be sent as 'feature codes' in the context of "pseudo-3WC" invocations.

Second, the invention does not require any new capabilities in existing cellular Radio Access Networks or in existing MSCs (or in existing HLRs, as with the USSD approach). It relies solely on existing (i.e., already standardized) WIN capabilities from the current cellular networks, thereby avoiding the need for additional network enhancements.

This present invention focuses on the use of WIN to support the desired capabilities. CDMA networks are viewed as the principal market for this capability (given the lack of other suitable solutions for addressing this market need). However, it is noted that analogous solutions might be pursued for other IN-based network technologies, other than WIN (e.g., corresponding CAMEL-based procedures might be pursued if USSD capabilities are not available, or if a more common approach is desired across GSM and CDMA solutions). A similar approach might also be pursued for wireline networks, potentially helping to facilitate the migration path for existing wireline network operators as they evolve their networks towards an IMS-based approach. Thus, this concept can be applied to the following areas: (i) use of WIN to support an IMS centralized service control model (as described herein); (ii) use of Customized Application Mobile Enhanced Logic (CAMEL) to support an IMS centralized service control model; (iii) use of wireline IN-based technologies such as Advanced Intelligent Networks (AIN) to support an IMS centralized service control model; and, (iv) use of wireline IN-based technologies such as Core INAP to support an IMS centralized service control model.

Usage of Invention for Several Illustrative Services

Having described the invention in general terms, the following description illustrates how this invention could be applied to several specific services (i.e., for Call Waiting [CW] and for Three-Way Calling [3WC]).

The overall processing associated with a Call Waiting invocation is partitioned into five segments, as highlighted in FIG. 6 and briefly discussed below.

1. When an incoming call arrives for a CW subscriber with an existing active CS call, the CW Application Server (AS) sends a WIN CCDIR message to the MSC. The DisplayText parameter is used to deliver a textual message to the CW subscriber (i.e., a notification of an additional incoming call, including the calling party identity), used as a CW notification. The BillingID parameter identifies the specific existing call to which the message is associated. The MSC performs the requested actions, i.e., delivering text to be displayed via the handset, and responds back to the CW AS.

2. Upon receiving the incoming call notification, the CW subscriber decides to invoke CW, e.g., via a flash signal. The handset detects this event and generates a Flash with Information message, containing a special digit string that is used to designate the user-requested event. The MSC receives this message and detects that a corresponding WIN trigger, e.g., All_Calls, is armed. The MSC then sends an ORREQ message to the designated SCP (i.e., to the CW AS depicted in FIG. 6), containing the corresponding feature control digits. The CW AS uses the received digits to determine the appropriate (CW) logic to invoke. In this case, the CW AS responds with an orreq message that instructs the MSC to abort its processing, while leaving the existing call intact.

3. The CW AS initiates procedures to establish a connection from the new incoming caller to the target CW subscriber (e.g., using Third-Party Call Control [3PCC] logic in the IMS domain). The CW AS also places the prior connection (between the CW subscriber and the original connected party) on hold (e.g., via re-INVITE procedures in the IMS domain).

Based on the above processing, the CW subscriber is connected to the new incoming call and the original call is placed on hold.

Figure 6:
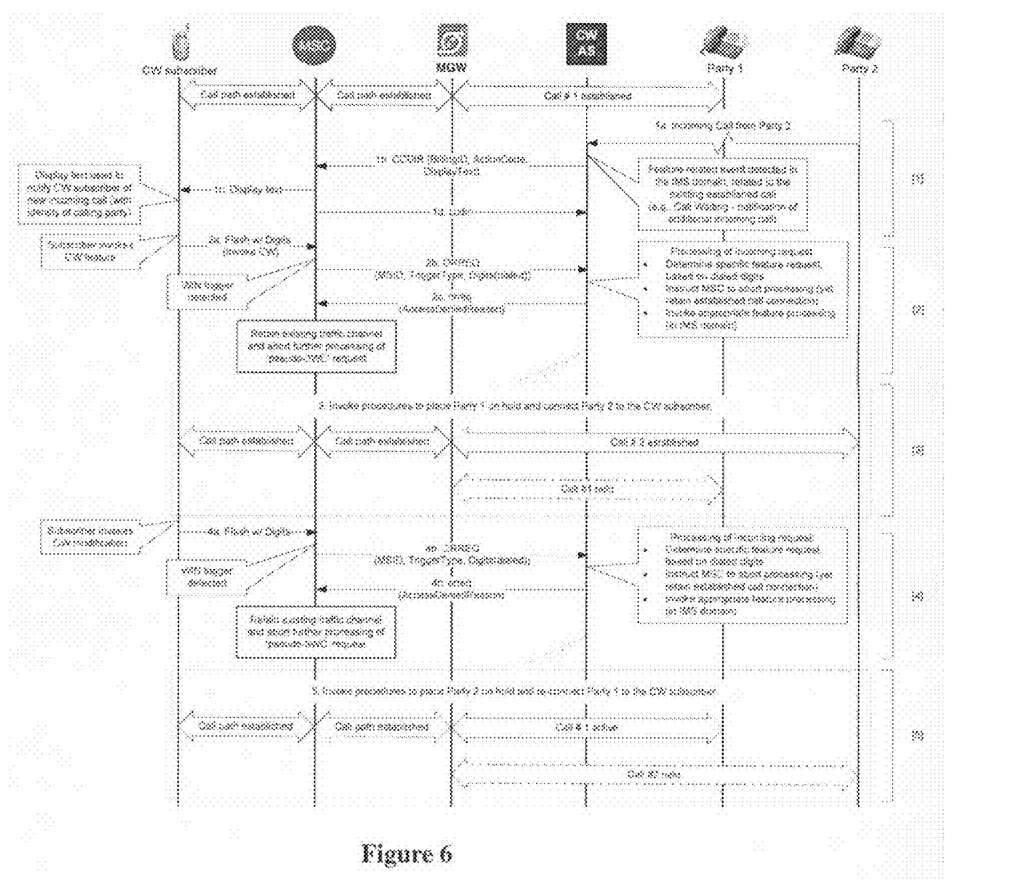
FIG. 6 shows a signal flow associated with a Call Waiting application.

Further processing (associated with subsequent CW logic) is partitioned into the final two segments, as depicted in FIG. 6.

4. The CW subscriber can toggle between the set of active and held calls via flash signals. The handset detects this event and generates a Flash with Information message, containing a special digit string that is used to designate the user-requested event. The MSC receives this message and detects that a corresponding WIN trigger (e.g., All_Calls) is armed. The MSC sends an ORREQ message to the designated SCP (i.e., to the CW AS), containing the corresponding feature control digits. The CW AS uses the received digits to determine the appropriate (CW) logic to invoke. The CW AS responds with an orreq message that instructs the MSC to abort its processing, while leaving the existing call intact.

5. The CW AS initiates procedures to re-establish the original call to the target CW subscriber and to place the connection between the CW subscriber and the new incoming call on hold (e.g., using re-INVITE procedures in the IMS domain).

Based on the above processing, the CW logic is able to toggle the active/held states of the connections between the CW subscriber and the new/original calls.

Figure 7:
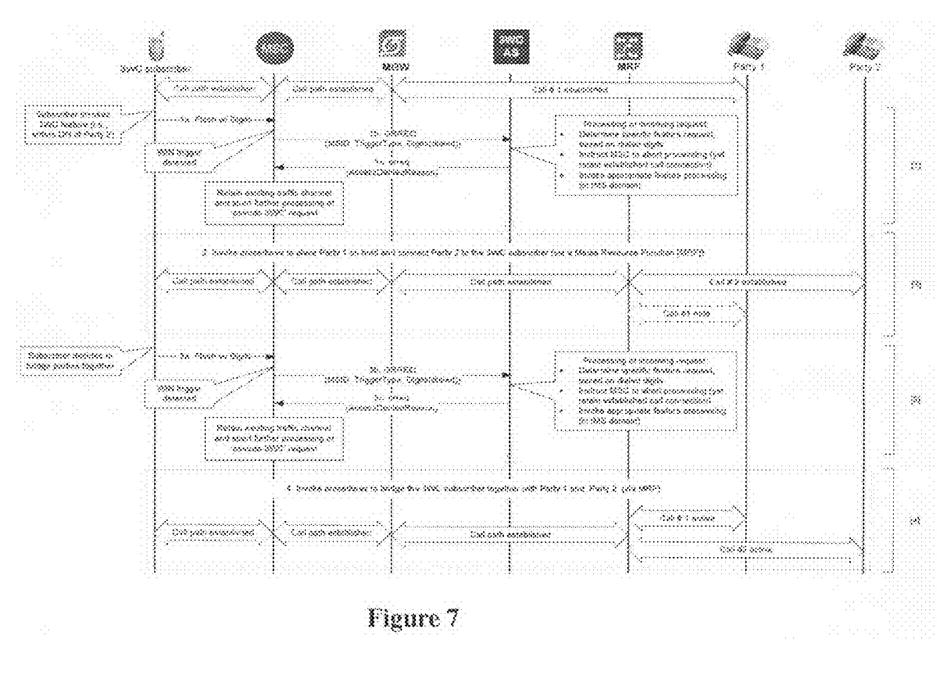
FIG. 7 shows a signal flow associated with a Three Way Calling application.

FIG. 7 illustrates how the current invention may be applied for Three Way Calling (3WC). In this flow, a Media Resource Function (MRF) is used to provide the network-based bridging functionality for this service.

The overall processing (associated with the 3WC invocation) is partitioned into four segments, as shown in FIG. 7 and described below.

1. The 3WC subscriber establishes an active call with another party ("Party 1"). Once this call is established, the 3WC subscriber decides to invoke 3WC (e.g., via entry of address digits for the additional party ["Party 2"]). The handset detects this event and generates a Flash with Information message, containing a digit string that includes the address of Party 2. The MSC receives this message and detects that a corresponding WIN trigger (e.g., All_Calls) is armed. The MSC therefore sends an ORREQ message to the designated SCP (i.e., to the 3WC AS shown in the figure), containing the corresponding digits. The 3WC AS uses the received digits to determine the appropriate (3WC) logic to invoke. In this case, the 3WC AS responds with an orreq message that instructs the MSC to abort its processing, while leaving the existing call intact.

2. The 3WC AS initiates procedures to establish a connection from the 3WC subscriber to a Media Resource Function (MRF), e.g., using 3PCC logic in the IMS domain. The 3WC AS instructs the MRF to [a] establish a connection from the 3WC subscriber toward the target party (Party 2) and [b] place the existing connection from the 3WC subscriber toward the original connected party on hold (e.g., via 3PCC and re-INVITE procedures in the IMS domain).

Based on the above processing, the 3WC subscriber is connected (via the MRF) to Party 2, and the original call leg toward Party 1 is placed on hold.

Subsequent processing associated with the 3WC service, used to bridge the three parties together, is partitioned into two additional segments as briefly discussed below.

3. The 3WC subscriber requests to be bridged together with Parties 1 and 2. The handset detects this event and generates a Flash with Information message, containing a special digit string that is used to designate the user-requested event. The MSC receives this message and detects that a corresponding WIN trigger (e.g., All_Calls) is armed. The MSC then sends an ORREQ message to the designated SCP (i.e., to the 3WC AS), containing the corresponding feature control digits. The 3WC AS responds with an orreq message that instructs the MSC to abort its processing, while leaving the existing call intact.

4. The received digits are used to determine the appropriate (3WC) logic to invoke. The 3WC AS initiates procedures to bridge together the three call legs (to the 3WC subscriber, to Party 1, and to Party 2) via the MRF to establish the three-way call (e.g., via 3PCC and re-INVITE procedures in the IMS domain).

While there has been described and illustrated a method and system for supporting feature control signaling between a user handset and a network-based service platform when the user handset is served by circuit switched access based on the use of WIN triggers, it will be apparent to those skilled in the art that modifications and variations are possible without deviating from the spirit and broad scope of the present invention which shall be limited solely by the scope of the claims appended hereto.

What is claimed is:

1. A method for using a network-based service platform for executing services on behalf of a first user, wherein the handset of the first user has an existing established communication session with the handset of a second user, comprising:

determining in the handset of the first user that a predetermined feature-event needs to be reported to a network-based service platform;

selecting in the handset of the first user a set of feature information to be sent when the predetermined feature-event has been detected;

sending a message containing the feature information from the handset of the first user to a network, when the feature-event has been detected;

detecting that a trigger condition has been satisfied in the network, when the message containing the feature information is received from the handset of the first user;

determining in the network the identification of a network-based service platform, when the trigger condition has been satisfied;

sending a message containing feature information from the network to the network-based service platform, when the trigger condition has been satisfied;

interpreting the feature information, contained in the message that is received by the network-based service platform, to determine the intended feature actions;

invoking the intended feature actions via service logic execution at the network-based service platform, in conjunction with processing elsewhere in the network;

instructing the network to pass feature information to the handset of the first user, by sending a message from the network-based service platform; and re-establishing a communications session between the handset of the first user and the handset of the second user.

2. The method of claim 1, wherein determining in the handset of the first user that a predetermined feature-event needs to be reported is based on user actions.

3. The method of claim 1, wherein the selecting in the handset of the first user a set of feature information to be sent is based on predefined feature-control digit strings that are maintained in the handset of the first user.

4. The method of claim 1, wherein the handset of the first user is a mobile handset.

5. The method of claim 1, wherein the network of the first user is a COMA cellular network.

6. The method of claim 1, wherein the sending a message containing the feature information from the handset of the first user to the network is based on the normal message used to invoke a three-way call.

7. The method of claim 6, wherein a COMA handset sends a Flash with Information message to the network as the mechanism to invoke a pseudo-three-way call.

8. The method of claim 1, wherein the detecting that a trigger condition has been satisfied in the network is based on an Intelligent Network (IN) trigger that is detected at a switching system in the network.

9. The method of claim 8, wherein the trigger condition is based on a Wireless Intelligent Network (WIN) trigger that is detected at a Mobile Switching Center (MSC) in the network.

10. The method of claim 8, wherein the determining the identification of a network-based service platform is based on an associated WIN TriggerAddressList value as previously received by a Mobile Switching Center (MSC).

11. The method of claim 8, wherein the sending a message containing feature information from the network to the network-based service platform is based on the IN trigger.

12. The method of claim 11, wherein the message containing feature information is the WIN OriginationRequest (ORREQ) message that is sent from the MSC to the network-based service platform.

13. The method of claim 11, wherein the feature information containing the feature-control digit string is populated in the Digits (Dialed) parameter of an associated WIN message.

14. The method of claim 1, wherein the interpreting the feature information contained in the message that is received by the network-based service platform is based on the predefined feature-control digit strings.

15. The method of claim 1, wherein the step of invoking the intended feature actions via service logic execution at the network-based service platform is based on centralized service control in an P Multimedia Subsystems (IMS-based) network.

16. The method of claim 1, wherein the instructing the network to pass feature information of the handset of the first user is based on sending a response from the network-based service platform to the switching system via the corresponding response to the IN trigger.

17. The method of claim 16, wherein the response from the network-based service platform to an MSC is a WIN OriginationRequest (orreq) response message.

18. The method of claim 17, wherein the WIN response message from the network-based service platform contains the AnnouncementList and/or DisplayText parameter for instructing the MSC to provide audible and/or visual indications to the handset of the first user and/or a routing address for invoking processing elsewhere in the network.

19. The method of claim 16, wherein the re-establishing a communications session between the handset of the first user and the handset of the second user is based on instructions from the network-based service platform that are conveyed to the switching system via parameters of the response message.

20. The method of claim 19, wherein the response message from the network-based service platform contains the AccessDeniedReason or ActionCode parameter populated to release the pseudo-3WC call leg and reconnect the handset of the first user and the handset of the second user.

21. The method of claim 1, wherein the network-based service platform is capable of supporting both WIN capabilities as defined for a WIN Service Control Point and service control functionality for another technology.

22. The method of claim 1, wherein the network of the first user is a GSM cellular network.

23. The method of claim 1, wherein the network-based service platform is capable of supporting both Customized Application Mobile Enhanced Logic (CAMEL) capabilities and service control functionality for another technology.

24. The method of claim 1, wherein the network of the first user is a wireline network.

25. The method of claim 1, wherein the network of the first user is a cable network.

26. The method of claim 1, wherein the network-based service platform is capable of supporting both Advanced Intelligent Network (AIN) capabilities and service control functionality for another technology.

27. The method of claim 1, wherein the network-based service platform is capable of supporting both Core NAP capabilities and service control functionality for another technology.

28. A method for using a network-based service platform for executing services for a first handset having an existing established communication session with a second handset, comprising:

determining in the network-based service platform that a feature-event needs to be reported to the first handset;

sending a message containing feature information from the network-based service platform to the network of the first handset based on a Wireless Intelligent Network (WIN) CallControlDirective (CCDIR) message that is sent from the network-based service platform to a Mobile Switching Center (MSC), wherein the WIN CCDIR message from the network-based service platform to the MSC contains the AnnouncementList and/or DisplayText parameter for instructing the MSC to provide audible and/or visual indications to the first user and/or ActionCode parameter for invoking other processing when the feature-event has been detected;

invoking the intended feature actions based upon the feature information contained in the message that is received by the network from the network-based service platform; and responding to the network-based service platform.

29. The method of claim 28, wherein the handset of the first user is a mobile handset.

30. The method of claim 28, wherein the network of the first user is a CDMA cellular network.

31. The method of claim 28, wherein the determining that a feature-event needs to be reported to the handset is based on an event that is detected by the network-based service platform based on centralized service control in an IP Multimedia Subsystems (IMS) based network.

32. The method of claim 28, wherein the invoking the intended feature actions is based on instructions from the network-based service platform that are conveyed to the MSC via parameters of the WIN CCDIR message.

33. The method of claim 28, wherein the responding to the network-based service platform is based on sending a WIN CallControlDirective (ccdir) response message.

34. The method of claim 28, wherein the network-based service platform is capable of supporting both WIN capabilities and service control functionality for another technology.

35. A system for using a network-based service platform for executing services on behalf of a first user, wherein the handset of the first user has an existing established communication session with the handset of a second user, comprising:

means for determining in the handset of the first user that a predetermined feature-event needs to be reported to a network-based service platform;

means for selecting in the handset of the first user a set of feature information to be sent when the predetermined feature-event has been detected;

means for sending a message containing the feature information from the handset of the first user to a network, when the feature-event has been detected;

means for detecting that a trigger condition has been satisfied in the network, when the message containing the feature information is received from the handset of the first user;

means for determining in the network the identification of a network-based service platform, when the trigger condition has been satisfied;

means for sending a message containing feature information from the network to the network-based service platform, when the trigger condition has been satisfied;

means for interpreting the feature information, contained in the message that is received by the network-based service platform, to determine the intended feature actions;

means for invoking the intended feature actions via service logic execution at the network-based service platform, in conjunction with processing elsewhere in the network;

means for instructing the network to pass feature information to the handset of the first user, by sending a message from the network-based service platform; and means for re-establishing a communications session between the handset of the first user and the handset of the second user.

* * * * *

UNITED STATES PATENT AND TRADEMARK OFFICE
CERTIFICATE OF CORRECTION

PATENT NO. : 7,606,571 B2
APPLICATION NO. : 11/717342
DATED : October 20, 2009
INVENTOR(S) : Donald Lukacs It is certified that error appears in the above-identified patent and that said Letters Patent is hereby corrected as shown below:

Claim 5, Column 9, Line 35; delete "COMA" to --CDMA--.
Claim 7, Column 9, Line 40; delete "COMA" to --CDMA--.
Claim 15, Column 10, Line 4; delete "P" to --IP--.
Claim 27, Column 10, Line 49; delete "NAP" to --INAP--.

Signed and Sealed this

Sixteenth Day of March, 2010

David J. Kappos
*Director of the United States Patent and Trademark Office*